Feb. 26, 1963
B. M. PRICE
3,078,494
WINDSHIELD WIPER
Filed March 13, 1959
4 Sheets-Sheet 1
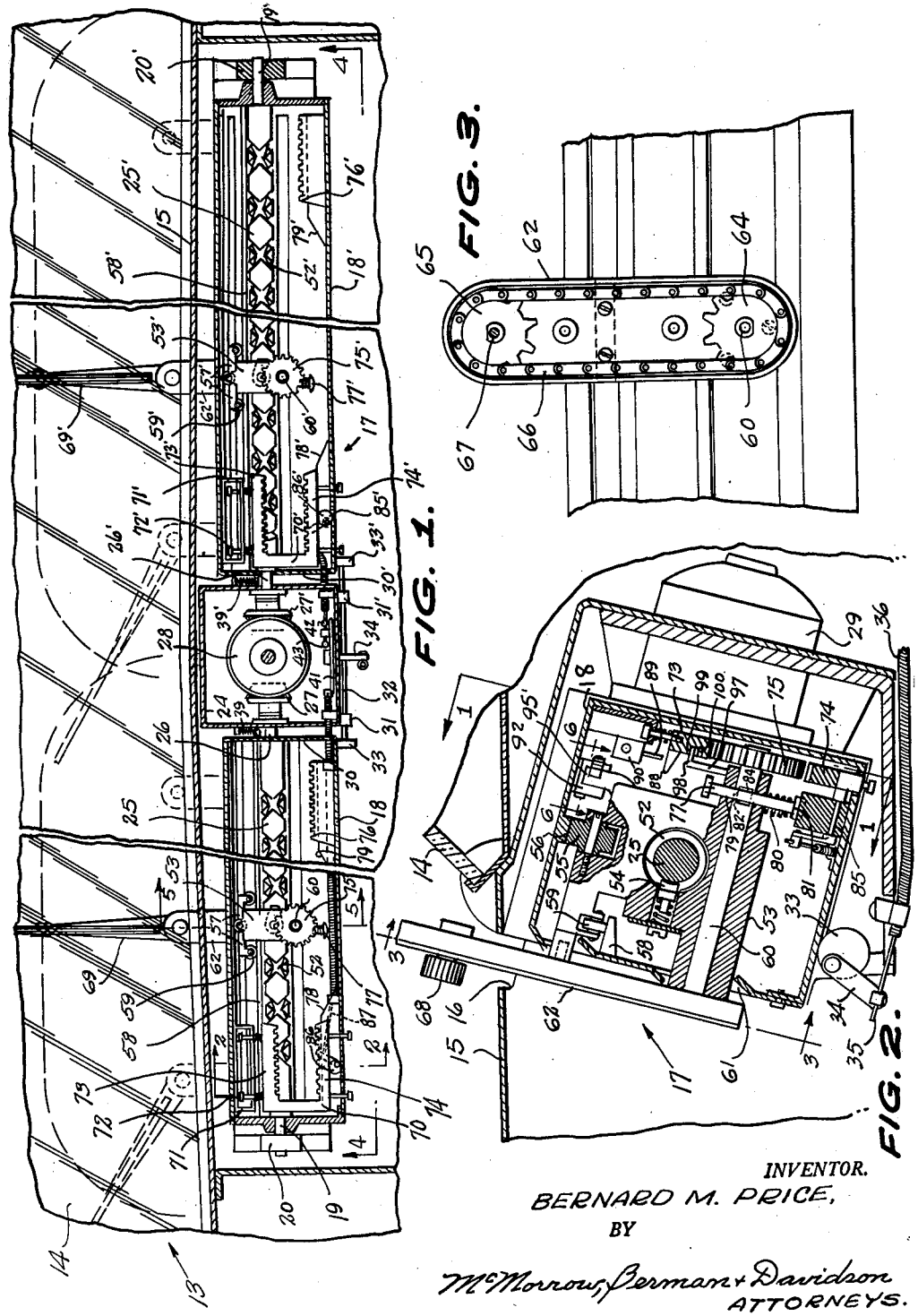
INVENTOR.
BERNARD M. PRICE,
BY
McMorrow, Berman & Davidson
ATTORNEYS.

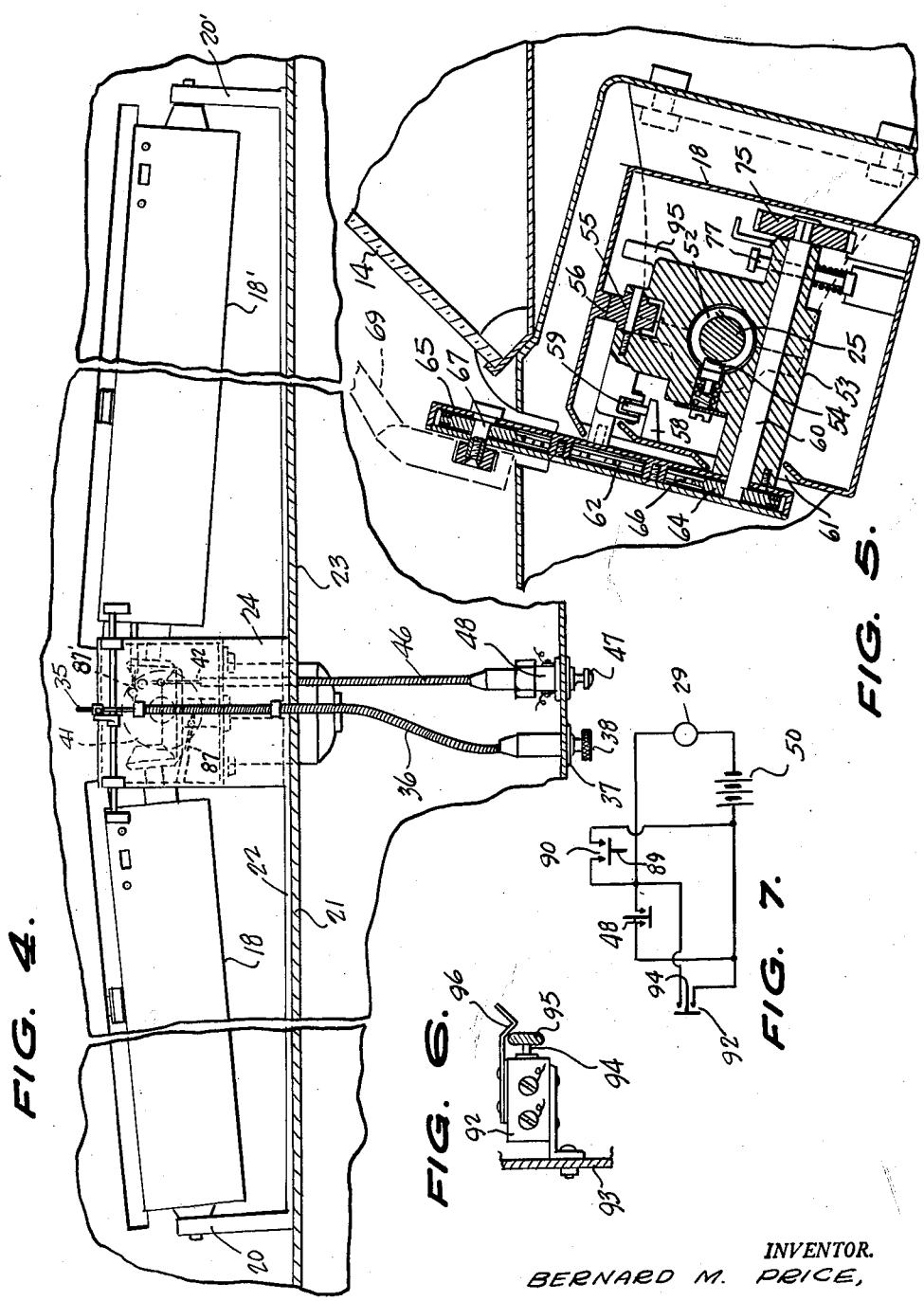

Feb. 26, 1963  B. M. PRICE  3,078,494
WINDSHIELD WIPER
Filed March 13, 1959  4 Sheets-Sheet 3
FIG. 8.
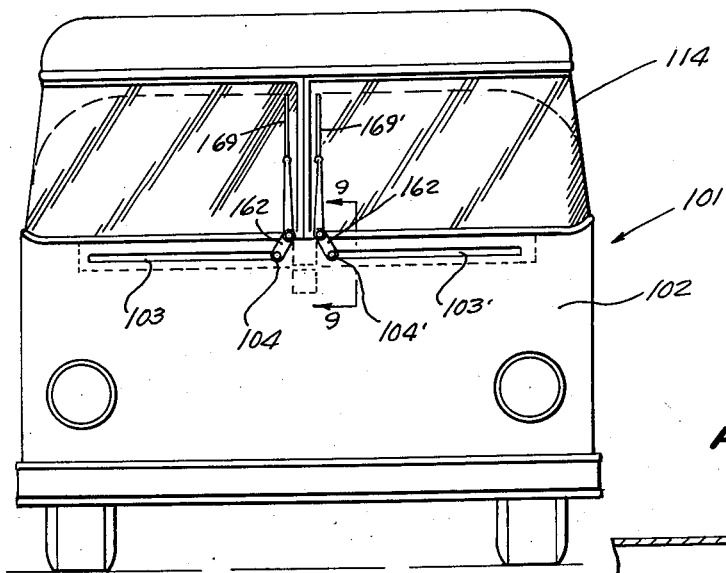
FIG. 10.
FIG. 9.
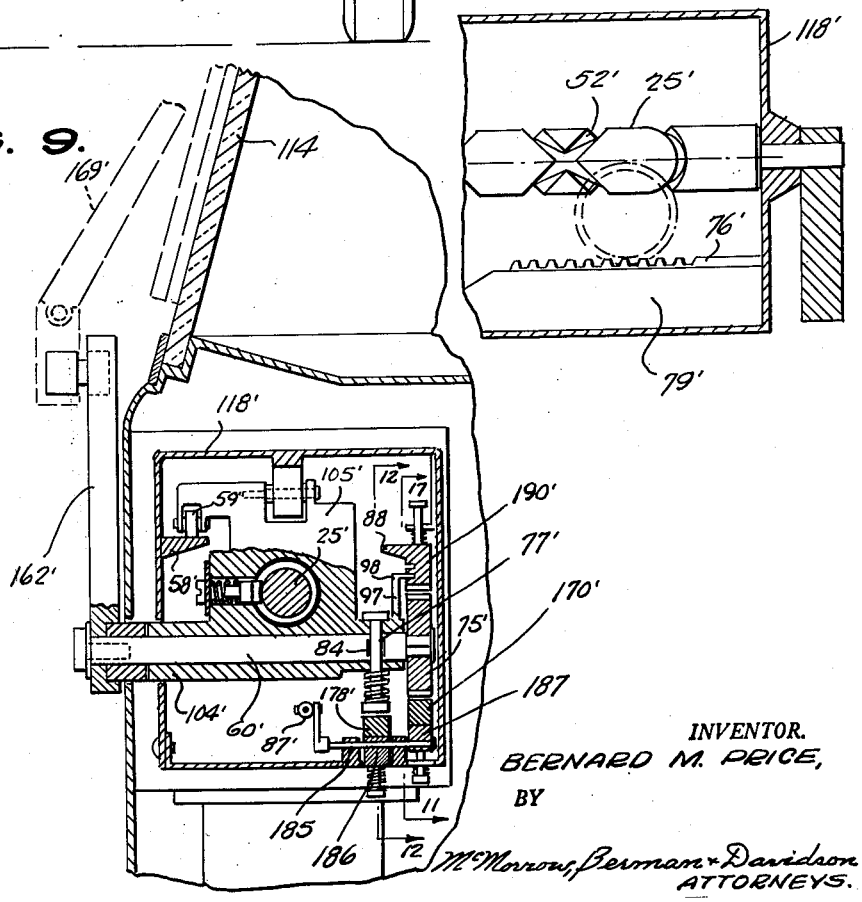
INVENTOR.
BERNARD M. PRICE,
BY
McMorrow, Berman & Davidson
ATTORNEYS.

INVENTOR.
BERNARD M. PRICE,
BY
McMorrow, Berman + Davidson
ATTORNEYS.

United States Patent Office 3,078,494
Patented Feb. 26, 1963

3,078,494
WINDSHIELD WIPER
Bernard M. Price, 205½ 83rd St., Marmet, W. Va.
Filed Mar. 13, 1959, Ser. No. 799,348
2 Claims. (Cl. 15—250.17)

This invention relates to windshield wipers for motor vehicles, and more particularly to a windshield wiper mechanism adapted to provide rectilinear as well as oscillating motion of the windshield wiper blades.

A main object of the invention is to provide a novel and improved windshield wiper mechanism for a motor vehicle, said mechanism being simple in construction, being relatively compact in size, and being automatic in operation.

A further object of the invention is to provide an improved windshield mechanism which is arranged so that the windshield wiper blades thereof move rectilinearly as well as angularly and wherein the pressure of the blades on the windshield may be at times increased so as to provide greater effectiveness in removing sleet, frost or snow from the windshield.

A still further object of the invention is to provide an improved windshield wiper mechanism which is relatively inexpensive to manufacture, which is reliable in operation, and which provides a means of clearing substantially the entire area of the windshield, rather than the limited areas cleared in the windshield wiper mechanisms heretofore employed.

A still further object of the invention is to provide an improved windshield wiper mechanism which can be installed on a wide range of models of motor vehicles, which is neat in external appearance, which operates efficiently for a wide range of weather conditions, and which is protected against the entry of dirt or other undesirable foreign material, so that the mechanism will not become clogged by such foreign material and will operate for long periods of time without requiring servicing.

Further objects and advantages of the invention will become apparent from the following description and claims, and from the accompanying drawings, wherein:

FIGURE 1 is a transverse vertical cross sectional view taken through the forward portion of a motor vehicle equipped with an improved windshield wiper mechanism constructed in accordance with the present invention, the view being taken through the cowling of the vehicle and being taken substantially on the line 1—1 of FIGURE 2.

FIGURE 2 is an enlarged vertical cross sectional view taken on the line 2—2 of FIGURE 1 showing one of the windshield wiper carriage members partly in vertical cross section.

FIGURE 3 is a cross sectional view taken substantially on the line 3—3 of FIGURE 2.

FIGURE 4 is a horizontal cross sectional view taken substantially on the line 4—4 of FIGURE 1.

FIGURE 5 is an enlarged vertical cross sectional view taken substantially on the line 5—5 of FIGURE 1.

FIGURE 6 is an enlarged cross sectional detail view taken substantially on the line 6—6 of FIGURE 2.

FIGURE 7 is a schematic electrical wiring diagram showing the electrical connections of the windshield wiper device illustrated in FIGURES 1 to 6.

FIGURE 8 is a front elevational view of a passenger bus equipped with a windshield wiper mechanism in accordance with the present invention.

FIGURE 9 is an enlarged vertical cross sectional view taken on the line 9—9 of FIGURE 8.

FIGURE 10 is an enlarged fragmentary vertical cross sectional view taken through an end portion of one of the supporting housings of the windshield wiper mechanism of FIGURES 8 and 9 on the axis of the associated drive screw and illustrating the manner in which the housing is pivoted on the reduced end portion of the drive screw.

Figure 11:
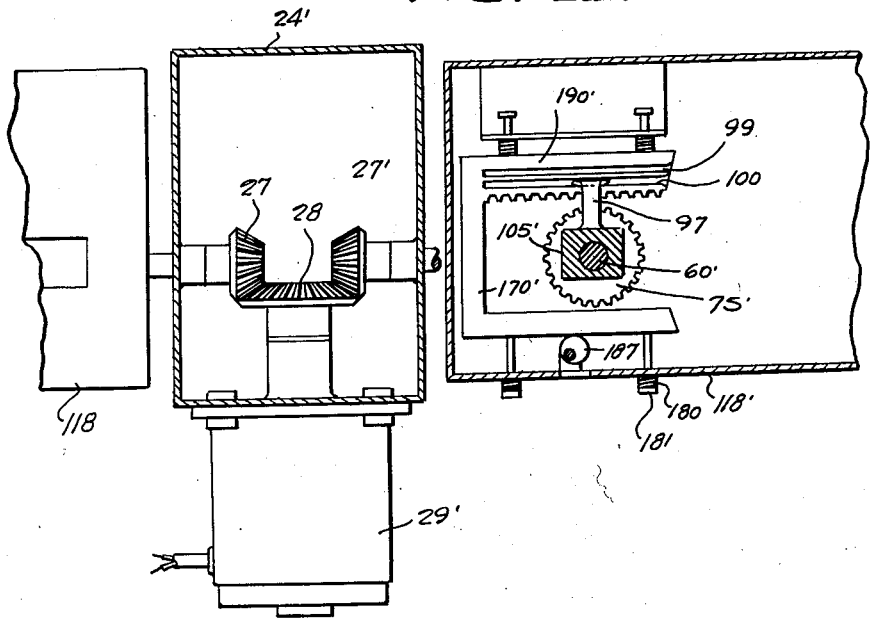
FIGURE 11 is an enlarged fragmentary vertical cross sectional view taken on the line 11—11 of FIGURE 9.

Referring to the drawings, and more particularly to FIGURES 1 to 7, 13 generally designates a motor vehicle provided with the usual windshield 14 and with a cowl portion 15 located forwardly adjacent the windshield 14. The cowl portion 15 is formed with a pair of slots 16 symmetrically located therein and extending from the intermediate portion thereof laterally toward the opposite side margins thereof, the slots being located immediately in front of the respective side portions of the windshield 14, and being similar to the slots illustrated in applicant's previously issued Patent No. 2,845,803, issued August 5, 1958, the present invention being an improvement over the device described and claimed in said previously issued patent.

Designated generally at 17 is a windshield wiper mechanism according to the present invention, said mechanism comprising a pair of elongated housing members 18, 18' which are pivoted at their respective end portions on respective outer end portions 19, 19' of respective shaft elements, said shaft end portions being rotatably received in bearing brackets 20, 20' which project from the ends of a bracket plate 22 which is rigidly secured to the substantially vertical, transversely extending firewall 23 of the motor vehicle.

Rigidly secured to the intermediate portion of the plate member 22 is a gear housing 24. The shaft elements 19 and 19' comprise the outer ends of respective drive screw members 25, 25', said drive screw members being provided with inner reduced shafts 26, 26' which are journaled in the respective side walls of the gear housing 24 and which are provided at their ends with pinion gears 27, 27' which meshingly engage with a driving bevel gear 28. Bevel gear 28 is secured on the shaft of an electric motor 29 which is secured to the rear wall of the gear box 24 and which is thus supported by the main bracket plate 22. Energization of motor 29 simultaneously drives the screw shafts 25, 25' while allowing the housings 18, 18' to be pivoted on the respective shaft end portions 19, 26 and 19', 26', since the inner end walls 30, 30' of the respective housings 18, 18' are rotatably supported on the inner shaft end portions 26, 26', so that the housings 18, 18' are pivoted on said shaft portions for rotation around the axis of the respective drive screw members 25, 25'.

The bottom wall of the gear box 24 has secured thereto a pair of pivot loops 31, 31' in which is rotatably supported a transversely extending shaft 32 provided on its outer ends with respective eccentric cam members 33, 33' which are engageable with the forward portions of the bottom walls of the respective supporting housings 18, 18'. A depending arm 34 is rigidly secured to the intermediate portion of shaft 32, and secured to the lower end of the arm 34 is one end of a Bowden cable 35, the Bowden cable 35 being provided with the flexible sheath 36 which is suitably secured to adjacent portions of the vehicle and which terminates at the vehicle dashboard 37. The Bowden cable 35 is provided with an operating knob 38 whereby when said knob 38 is pulled, the arm 34 is rotated in a counterclockwise direction, as viewed in FIGURE 2, causing the eccentric cam members 33, 33' to exert an upward force on the respective housings 18, 18', thereby causing said housings to be rotated in a clockwise direction, as viewed in FIGURE 2, whereby the windshield blades associated with the housings are forced against the windshield 14 to provide an increased cleaning pressure thereon which may be required for removing sleet, frost or snow from the windshield.

As in applicant's prior Patent No. 2,845,803, suitable biasing means may be provided to bias the housings 18, 18' in a direction to normally urge the windshield wiper blades carried thereby against the windshield, for example, by provision of biasing springs 39, 39' acting between the housings 18, 18' and the gear housing 24.

Designated at 41 is a disc member which is rotatably mounted on the bottom wall of the gear box 24, said disc member being operated by a Bowden cable 42 which extends through a sheath 46 and which is provided with a control knob 47 located on the instrument panel 37 of the motor vehicle. As in applicant's prior Patent No. 2,845,803, the Bowden cable 42 extends slidably through an apertured abutment pin 43 secured on the disc member 41, the cable being provided on opposite sides of the abutment pin with spaced abutment members to provide a certain amount of lost-motion between the cable and the disc member 41. The disc member 41 is suitably biased in a counterclockwise direction, as viewed in FIGURE 4, by spring means, not shown.

Associated with the knob 47 is a conventional switch 48 of the plunger type which is closed responsive to an outward pull exerted on the knob 47. The switch 48 is arranged so that a preliminary pull exerted on the switch control knob 47 will close the switch contacts but will not be sufficient to rotate said disc 41. As in applicant's prior patent, when the disc 41 is rotated by further movements of the Bowden cable 42 resulting from further outward movement of the knob 47, the disc member 41 is rotated in a clockwise direction, and the biasing force of its associated spring will be overcome and the disc will be maintained in its rotated position by means presently to be described, so that the switch 48 remains closed until the knob 47 is returned to its normal position.

As shown in FIGURE 7, the switch 48 is connected in circuit with the motor vehicle battery 50 and the motor 29, whereby said motor becomes energized responsive to the closure of switch 48.

As in applicant's prior patent, No. 2,845,803, the respective shafts 25 and 25' are formed with continuous threads comprising cross bowed and reverse identical grooved portions connected at their ends by reversing grooves, known as "Yankee" threads and designated at 52, 52'. Designated respectively at 53, 53' are carriage members mounted on the shafts 25, 25' and provided with spring-biased thread-engaging members 54 which are engaged in the respective threads 52, 52' in the manner illustrated in FIGURE 2, whereby to cause the carriage members 53 and 53' to follow respective threads 52, 52' responsive to the rotation of the shafts 25, 25'. The top end portions of the respective carriage members 53, 53' are provided with guide rollers 55, 55' which engage beneath guide rails 56 provided on the undersurfaces of the top walls of the respective housing members 18, 18'. Longitudinally extending pairs of arms 57, 57 and 57', 57' project from the opposite ends of the top portions of the carriage members 53, 53' and engage on horizontal supporting flanges 58, 58', suitable rollers 59, 59' being journaled on the ends of the arms 57 and 57' to engage in supporting flanges 58, 58' and to cooperate with the rollers 55, 55' to stabilize the carriage members 53, 53' as they move along the shafts 25, 25'.

Transversely journaled in the respective carriage members 53, 53' are the driving shafts 60, 60', the carriage members extending through the forward walls of the housing members 18, 18' at slots 61, as shown in FIGURE 2. Respective upwardly extending hollow arms 62, 62' are secured to the forwardly projecting portions of the carriage members 53, 53'. The shafts 60, 60' extend into the hollow arms 62, 62', and mounted on said shafts are respective sprocket wheels 64, as shown in FIGURE 3. Journaled in the top portions of the hollow arms 62, 62' are cooperating sprocket wheels 65 which are coupled to the sprocket wheels 64 by drive chains 66, as shown in FIGURE 3. The sprocket wheels 65 are mounted on shafts 67 which project through the front walls of the hollow arms 62, 62' and which have pinion gears 68 secured thereon, said pinion gears 68 being adapted to be secured in the conventional socket elements of respective windshield wiper arms 69, 69' so as to support the windshield wiper arms in upstanding positions engaged against the windshield 14.

As will be presently described, the windshield wiper arms 69, 69' are maintained in upstanding positions while they travel through the intermediate portions of their paths of movement and are oscillated at respective end portions of said paths of movement.

Movably mounted in the left ends of the respective housing members 18, 18', as viewed in FIGURE 1, are respective generally U-shaped rack members 70, 70', said rack members being vertically mounted and being suspended from respective U-shaped bracket bars 71, 71' secured to the top walls of the respective housing members 18, 18'. Suspension bolts 72, 72' extend slidably through apertures in the bight portions of the bracket members 71, 71' and are threadably secured in the top bar elements of the respective U-shaped rack bars 70, 70', suitable coil springs being provided beneath said bight portions to bias the rack bars 70, 70' downwardly.

Each of the U-shaped rack bars 70, 70' comprises a pair of top and bottom rack bars, shown at 73, 74 and 73', 74', said rack bars having inwardly facing teeth, the upper rack bars 73, 73' being provided with downwardly facing teeth and the lower rack bars 74, 74' being provided with upwardly facing teeth, as is clearly shown in FIGURE 1. Mounted on the respective driving shafts 60, 60' are respective rack gears 75, 75' which are meshingly engageable with the upper rack bars 73, 73' when the U-shaped rack members 70, 70' are in their lowered positions and which are meshingly engageable with the lower rack bars 74, 74' when the rack members 70, 70' are in elevated positions, as will be subsequently explained.

Mounted on the bottom walls of the respective housing members 18, 18' adjacent the right ends of said housing members, as viewed in FIGURE 1, are the respective rack bars 76, 76' having upwardly facing teeth, as shown in FIGURE 1, and being meshingly engageable with the pinion gears 75, 75' when the respective carriage members 53, 53' are adjacent the right ends of the housing members 18, 18', as viewed in FIGURE 1.

As will be readily understood, when the pinion gears 75, 75' engage with the rack bars, the driving shafts 60, 60' are oscillated, transmitting corresponding oscillations to the windshield wiper blade 69, 69' through the sprocket wheels 64, 65 and their drive chains 66, whereby the windshield wiper blades 69, 69' are oscillated when the carriage members 53, 53' are moving in the respective opposite end portions of the housing members 18, 18'.

The rack elements at the opposite ends of the respective housings 18, 18' are mounted in the same vertical planes as their associated pinion members 75, 75', so that although the respective housings 18, 18' are angled relative to each other, as shown in FIGURE 4, the pinions 75, 75' are in the same vertical planes as their associated rack members 70, 76 and 70', 76'.

Respective vertical follower members 77, 77' extend through and depend from the rear portions of the carriage members 53, 53', the bottom ends of the follower members 77, 77' being engageable with guide ramps provided on the bottom walls of respective housings 18, 18' to guide the associate carriage members so that the rack gears 75, 75' engage the rack bar elements at the respective end portions of the housings. Thus, the housing 18 is provided with the guide ramps 78 and 79 respectively at its left and right ends. The follower members 77, 77' are vertically slidable in bores 79 formed in the respective carriage members 53, 53' and are biased downwardly by respective coil springs 80 bearing between the bottom surfaces of the carriage members and the head portions 81 of the follower members. The shank portions of the follower members 77, 77' are formed at their intermediate portions with arcuate transverse notches 82 in which the windshield wiper shafts 60, 60' are rotatably receivable when the follower members have been elevated by their associated ramps. Thus, the driving shafts 60, 60' are free to rotate when the follower members have been thus elevated. The shafts 60, 60' are formed with cylindrical transverse grooves 84, as shown in FIGURE 2, engageable with the shank portions of the follower members 77, 77' when the shank portions are in lowered positions, namely, when the carriage members 53, 53' are in the intermediate portions of their respective housings 18, 18', whereby under these conditions, the shafts 60, 60' are locked against rotation, and whereby the associated windshield wiper arms 69, 69' are locked in upright positions.

As will be apparent from FIGURE 2, when the follower members are elevated, the arcuate notches 82, 84 register, allowing the shafts 60, 60' to rotate from their locked positions. When the follower members are lowered by the action of the biasing springs 80, the shafts 60, 60' lockingly engage with the follower members at their arcuate notches 84, whereby the shafts 60, 60' cannot rotate.

Transversely journaled in the bottom portions of the housings 18, 18' at their left ends, as viewed in FIGURE 1, are respective cam shafts 85, 85', and secured on the ends of said cam shafts are respective eccentric cams 86, 86' which are disposed beneath the intermediate portions of the respective vertically movable, U-shaped rack members 70, 70'. The cam shafts 85, 85' are provided with suitable crank arms which are connected at their ends to the respective Bowden cables 87, 87', said Bowden cables being connected to diametrically opposed points on the manually rotatable disc member 41.

As above explained, lost-motion is provided between the Bowden cables 42 and the abutment element 43 on the disc member 41, allowing switch 48 to be closed when a preliminary pull is exerted on the control knob 47. When a further pull is exerted on the control knob 47, torque is exerted on the disc member 41 to rotate same, said torque being converted into respective thrusts applied to the Bowden cables 87, 87', which thereby rotate respective eccentric cams 86, 86', whereby the U-shaped rack members 70, 70' are elevated, responsive to the rotation of the disc member 41 in a clockwise direction, as viewed in FIGURE 4. Elevation of the U-shaped rack members 70, 70' aligns the lower rack bar elements thereof with the teeth of the rack gears 75, 75' for meshing engagement therewith.

A sufficient amount of rotation of the disc member 41 is provided so that the cams 86, 86' may be rotated to dead center positions, maintaining the rack members 70, 70' elevated when the control knob is released after a predetermined pull has been exerted thereon. Conversely, the rack members 70, 70' may be lowered when the knob 47 is pushed inwardly to its normal, non-working position. The return of the knob 47 to said non-working position also opens the switch 48.

A lug 88 projects outwardly from the top portion of the U-shaped rack member 70, said lug being engageable with the plunger element 89 of a micro switch 90 mounted in the upper portion of housing member 18, as shown in FIGURE 2. Micro switch 90 is of the normally open type, namely, closes when its plunger element 89 is engaged by the lug 88 responsive to the elevation of the U-shaped rack member 70.

As shown in FIGURE 7, the micro switch 90 is connected in parallel with the manually operated control switch 48.

A second micro switch 92 is mounted on the end wall 93 of housing member 18, said micro switch 92 having a horizontally projecting operating plunger 94 which is engageable by an upwardly projecting lug 95 carried by the carriage member 53. The lug 95 is located so that said lug engages the micro switch plunger 94 when carriage member 53 is in its extreme leftward position in housing 18, as viewed in FIGURE 1. Micro switch 92 is provided with a yieldable locking clip 96 which is lockingly engageable with the lug 95 to yieldably retain said lug in engagement with the plunger 94 when the carriage member 53 is in said extreme leftward position.

The micro switch 92 is of the normally closed type, namely, closes its contacts when the lug 95 disengages from the plunger 94. Switch 92 is connected in parallel with switches 48 and 90, as shown in FIGURE 7. In FIGURE 7 the switch 92 is shown in its open position, namely, in the position corresponding to FIGURE 6 wherein the lug 95 is in engagement with the plunger 94.

When the windshield wipers are not in operation, the respective rack members 70, 70' are lowered and the carriage members 53, 53' are in the left end portions of the housing 18, 18', as viewed in FIGURE 1, with the pinion gears 75, 75' meshingly engaged with the upper rack bar elements 73, 73' at the intermediate portions of said rack elements, whereby windshield wiper arms 69, 69' will be in inclined positions.

The rear portion of carriage member 53 is formed with an upwardly projecting locking finger 97 having a horizontally extending lug 98 selectively engageable in a pair of vertically spaced horizontal grooves 99 and 100 formed in the forward face of the upper rack bar elements 73. The lug 98 engages in the upper locking groove 99 when the rack member 70 is in its lowered position and engages in the lower locking groove 100 when the rack member 70 is in its elevated position. The locking lug 98 thus maintains the rack member 70 in either its elevated or lowered position until the carriage member 53 moves away from the rack member 70 sufficiently to allow the lug 98 to disengage from the locking groove 99 or 100.

As shown in FIGURE 7, the respective switches 90, 48 and 92 are connected in parallel across the series circuit including motor 29 and the vehicle battery 50. Therefore motor 29 will be energized as long as any one of the switches 90, 48 or 92 remains closed.

To start the mechanism, the knob 47 is first pulled out sufficiently to close the switch 48 and is held in this position while motor 29 becomes energized and rotates the shafts 25, 25'. The carriage members 53, 53' in their starting positions are substantially at the left ends of the "Yankee" threads 52, 52', whereby the carriage members 53, 53' move to the right as shafts 25, 25' rotate. Since the rack members 70, 70' are in their lowered positions, the locking lug 98 engages in the upper locking groove 99, preventing the rack bars 70, 70' from being elevated until the carriage members 53, 53' clear the rack members 70, 70', as above explained.

As the carriage members 53, 53' move to the right, as viewed in FIGURE 1, the windshield wiper blade arms 69, 69' are rotated to upright positions by the cooperation of the rack gears 75, 75' with the upper rack bar elements 73, 73'. Thus, the arms 69, 69' are upright when the carriage members 53, 53' clear the rack members 70, 70', moving to the right, as viewed in FIGURE 1. This action occurs in a relatively short period of time, during which the knob 47 is held by the operator. As soon as the carriage members 53, 53' clear the rack members 70, 70', the operator pulls the knob 47 outwardly sufficiently to elevate the rack members 70, 70' by the action of the eccentric cams 86, 86', as above described, after which the operator can release the knob 47, allowing the mechanism to continue in operation. When the follower members 77, 77' disengage from their ramps 78, 78', the driving shafts are locked by the engagement of their grooves 84 with the shank portions of the follower members, as above described.

Therefore, as in applicant's prior Patent No. 2,845,803, the windshield wiper blades 69, 69' will be locked in upright positions after the follower members 77, 77' clear their ramps 78, 78' and are caused to travel rectilinearly across the windshield until the rack gears 75, 75' meshingly engage with the lower rack members 76, 76', at which positions the follower members 77, 77' engage the ramp elements 79, 79'. When the follower members engage the ramp elements 79, 79', said follower members are elevated, again releasing the driving shafts 60, 60' for rotation. Thus, the blades 69, 69' oscillate when the carriage members reach the right end portions of the housings 18, 18'. The oscillation continues until the carriage members 53, 53', in their reverse movement, clear the ramps 79, 79', whereby the driving shafts 60, 60' are again locked, locking the blade elements 69, 69' in upright positions. The leftward movement of the carriage members 53, 53' continues until the rack gears 75, 75' engage the lower rack elements 74, 74' of the lower rack members 70, 70', at which time the follower members 77, 77' engage the ramps 78, 78', allowing the driving shafts 60, 60' to again be rotated and causing the windshield wiper blades 69, 69' to be oscillated.

The above action may continue as long as the operator desires, and if additional cleaning pressure is required, the knob 38 may be pulled outwardly, allowing the wiper blades 69, 69' to be pressed against the windshield with increased force, sufficient to remove sleet, frost or snow from the windshield.

It will be understood that as the carriage members 53, 53' reach the leftward end of their paths of travel, the lug 95 engages past the yieldable clip element 96 and opens the micro switch 92, but since switch 48 is closed, this has no effect on the motor 29, which continues operating. Furthermore, the switch 90 is closed as long as the U-shaped rack member 70 remains elevated.

To terminate operation of the mechanism, the knob 47 is returned to its non-working position, whereby the switch 48 is opened. This also rotates the disc member 41 in a counterclockwise direction, as viewed in FIGURE 4, because of the abutment of the rearward abutment element on the Bowden cable 42 with the upstanding abutment element 43 on disc member 41. The eccentric cams 86, 86' are rotated to allow the U-shaped rack members 70, 70' to be lowered. However, if the carriage member 53 is engaged with the upper element 73 of the rack member 70, the lowering of the rack member 70 cannot occur until locking finger 98 disengages from the lower locking groove 100. This can only occur when the carriage member 53 moves to the right away from the U-shaped rack member 70 and clears same. At this time, the rack member 70 descends, causing the lug 88 to disengage from the plunger element 89 of switch 90 and allowing said switch to open. However, motor 29 remains energized since micro switch 92 remains closed. However, when the carriage member 53 returns after moving to the right and reversing in direction, the carriage member engages again with the rack member 70, this time with said rack member lowered. The leftward movement of carriage member 53 continues until lug 95 moves past the V-shaped detent portion of the resilient clip member 96 and engages with the plunger 94, opening switch 92, thus de-energizing the motor 29. Lug 95 is held against plunger 94 by the locking clip 96, thus preventing accidental closure of the switch 92.

Figure 12:
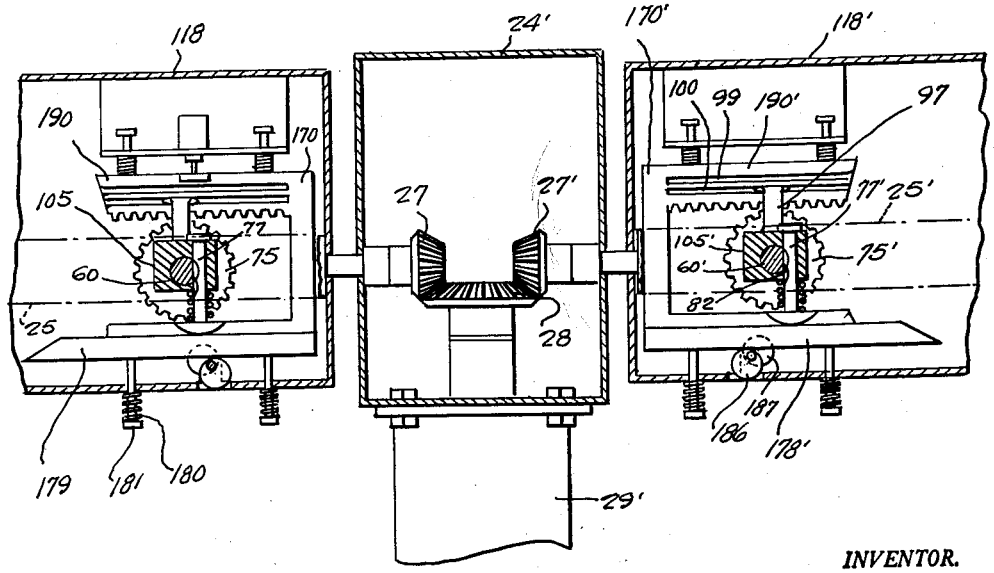
FIGURE 12 is an enlarged fragmentary vertical cross sectional view taken on the line 12—12 of FIGURE 9.

FIGURES 8 to 12 illustrate a windshield wiper mechanism according to the present invention applied to a passenger bus 101. As shown, the front wall 102 of the bus is formed with the respective horizontal slots 103, 103' through which the forward portions 104, 104' of the respective carriage members 105, 105' project. The driving motor 29' is shown vertically mounted and is supported by the bottom wall of the fixed gear housing 24', as illustrated in FIGURE 12. The respective windshield wiper mechanism housing members 118 and 118' are rotatably mounted on the reduced end portions of the respective grooved shafts 25, 25' in the same manner as previously described. Respective extension arms 162 and 162' are rigidly secured to the ends of respective driving shafts 60, 60', and the respective windshield wiper blades 169 and 169' are secured to the top end portions of the extension arms 162, 162'.

As shown in FIGURE 12, the vertically movable U-shaped rack members 170, 170' are located at the inner ends of the housings 118, 118', namely, adjacent the fixed gear housing 24', and the carriage members 105, 105' are so arranged that in their starting positions the blades 169, 169' are located in vertical parallel positions at the intermediate portion of the vehicle windshield assembly 114.

The respective ramp members 179 and 178' at the inner ends of respective housings 118 and 118' are mounted for vertical movement and are biased downwardly by coiled springs 180 engaging headed studs 181 secured to the bottom surfaces of the ramp members and extending through the bottom walls of the housing members 118 and 118', said springs bearing on said bottom walls to bias the ramp members downwardly, as will be apparent from FIGURE 12.

The cam shafts, shown at 185 are provided with the respective eccentric cams 186 and 187 underlying the ramp members and vertically movable U-shaped rack members and being angularly displaced by angles of one-hundred eighty degrees so that as the ramp members are elevated the U-shaped rack members are lowered. Said rack members are provided with toothed rack elements, shown at 190 and 190', said rack elements being meshingly engageable with the respective driving gears 75 and 75' when the U-shaped rack members are lowered.

In the normal non-working condition of the mechanism the ramp members 179 and 178' are lowered, as shown in FIGURE 12, whereby the follower members 77 and 77' are likewise lowered and lock the driving shafts 60, 60' against rotation. However, under these conditions, the U-shaped members 170 and 170' are elevated so that the rack teeth of the toothed rack bars 190, 190' are disengaged from the rack gears 75, 75'. Therefore the blades 169, 169' are locked against rotation.

It will be noted that upwardly extending locking fingers 97 are provided on the respective carriage members 105, 105', the locking fingers being provided with horizontal lugs 98 which are engageable in vertically spaced locking grooves 99 and 100 provided in the upper rack bar elements 190 and 190'. When the locking fingers 98 engage in the lower groove 100 the rack members 170 and 170' are held in elevated positions with their rack bar members 190, 190' out of mesh with the driving gears 75, 75'.

When the fingers 98 engage in the upper grooves 99, the rack members 170, 170' are held in lowered positions with the rack members 190, 190' meshingly engaged with the respective rack gears 175, 175'.

In the normal non-working position of the elements, shown in FIGURE 12, the rack members 170, 170' are held in non-meshing relation with respect to the gears 75, 75' and the follower members 77, 77' are in their lowered positions, locking the driving gears 60, 60' against rotation. When the apparatus is started, in the same manner as described in connection with the previously described form of the invention, rotation of the cam shaft 185 elevates the ramp members 179, 178' releasing the driving shafts 60, 60', but the rack members 170, 170' are held against descent by the engagement of the locking fingers 98 in the lower grooves 100. However, the motor 29' becomes energized and rotates the grooved shafts 25, 25' causing the carriage members 105, 105' to move outwardly to positions wherein the follower members 77, 77' clear the ramps 179, 178', again locking the driving shafts 60, 60' while at the same time allowing the U-shaped rack members 170, 170' to descend, since the locking fingers 98 disengage from the lower locking grooves 100. Thus, when the apparatus is started the windshield wiper blades 169, 169' are not oscillated but merely are moved outwardly by the action of the carriage members 105, 105′, rotating relatively slightly but being restored to vertical positions as soon as the follower members 77, 77′ drop downwardly as they clear the ramp members 179, 178′. The windshield wiper blades 169, 169′ are thus locked in vertical positions as they move rectilinearly outwardly, and are oscillated at the outer ends of their movement in the same manner as in the previously described form of the invention by the meshing engagement of the gears 75, 75′ with rack bars similar to the rack bars 76′ shown in FIGURE 1, the blades then reversing their movement and returning toward the center of the windshield assembly 114. As the carriage members engage the rack bars 190, 190′, the windshield wipers are oscillated since the U-shaped members 170, 170′ are in their lowered positions wherein meshing engagement may occur between the rack bar elements 190, 190′ and the rack gears 75, 75′.

To terminate operation of the mechanism the control knob is pushed inwardly, as in the case of the form of the invention illustrated in FIGURES 1 to 7, whereby the cam shafts 185 are returned to their normal positions. This lowers the ramp members 179, 178′ and elevates the rack members 170, 170′. Thus, the driving shafts 60, 60′ are maintained locked as they move inwardly toward their final positions and the rack gears 75, 75′ cannot meshingly engage the rack elements 190, 190′ since the U-shaped members 170, 170′ are in elevated positions. Termination of the operation of the mechanism occurs when the carriage member 105 opens a limit switch, corresponding to the micro switch 92 of FIGURE 2, and included in a circuit similar to that shown in FIGURE 7.

While certain specific embodiments of an electrically operated automatic windshield wiper mechanism for motor vehicles have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A windshield wiper assembly comprising a substantially horizontal one-piece, generally U-shaped bracket plate having bearing brackets projecting from its opposite ends and having a flat intermediate portion adapted to be secured to the transverse vertical firewall of a motor vehicle, a gear housing rigidly secured to the intermediate portion of said bracket plate, respective drive screws journaled between the bearing brackets and the respective side walls of the gear housing, respective bevel gears on the ends of the drive screws inside said gear housing, a driving bevel gear mounted in said gear housing meshing with said first-named bevel gears, each drive screw having a continuous thread comprising crossed forward and reverse helical groove portions connected at their ends by reversing grooves, a carriage member engaging each drive screw, a driving shaft journaled in each carriage member, an upwardly extending arm secured to each carriage member, a windshield wiper shaft journaled in the top portion of each arm, means drivingly coupling each driving shaft to the adjacent windshield wiper shaft, a horizontal rack bar movably mounted adjacent an end of each drive screw, a pinion gear on each driving shaft at times meshingly engageable with the adjacent rack bar, whereby to oscillate the driving shaft when the associated carriage member moves toward and returns from the outer reversing groove of the associated drive screw, a drive motor coupled to said driving bevel gear, a source of current, circuit means connecting said drive motor to said source of curent and including first, second and third parallel-connected switches, manually operated means controlling said first switch, means on one rack bar controlling the second switch, manually operated means controlling the movement of the rack bars, vertical locking pins sildably mounted in the carriage members and being lockingly engageable with the respective driving shafts to prevent rotation thereof, said locking pins each being formed with a release notch, means to elevate the locking pins sufficiently to move the release notches adjacent the driving shafts to release the driving shafts for rotation responsive to the movement of the carriage members to positions adjacent the rack bars, manually operated means to elevate said rack bars, the rack bars being each formed with a pair of vertically spaced, horizontal longitudinally extending grooves, and a supporting projection on each carriage member located to slidably engage in one or the other of the grooves of the associated rack bar in accordance with the raised or lowered positions of the rack bars.

2. A windshield wiper assembly comprising a substantially horizontal one-piece, generally U-shaped bracket plate having bearing brackets projecting from its opposite ends and having a flat intermediate portion adapted to be secured to the transverse vertical firewall of a motor vehicle, a gear housing rigidly secured to the intermediate portion of said bracket plate, respective drive screws journaled between the bearing brackets and the respective side walls of the gear housing, respective bevel gears on the ends of the drive screws inside said gear housing, a driving bevel gear mounted in said gear housing meshing with said first-named bevel gears, each drive screw having a continuous thread comprising crossed forward and reverse helical groove portions connected at their ends by reversing grooves, a carriage member engaging each drive screw, a driving shaft journaled in each carriage member, an upwardly extending arm secured to each carriage member, a windshield wiper shaft journaled in the top portion of each arm, means drivingly coupling each driving shaft to the adjacent windshield wiper shaft, a horizontal rack member movably mounted adjacent an end of each drive screw, said rack members comprising top and bottom opposing rack bars, means supporting the rack members for vertical movement adjacent the ends of the drive screws, pinion gears on the driving shafts at times meshingly engageable with either the top or bottom rack bars, whereby to oscillate the driving shafts when the carriage members move toward and return from the ends of the drive screws, means biasing said rack members to lowered positions wherein said pinion gears meshingly engage the upper rack bars, a drive motor coupled to said driving bevel gear, a source of current, circuit means connecting said drive motor to said source of current and including first, second and third parallel-connected switches, manually operated means controlling said first switch, means on one rack member controlling the second switch, manually operated means controlling the movement of the rack members, vertical locking pins slidably mounted in the carriage members and being lockingly engageable with the respective driving shafts to prevent rotation thereof, said locking pins each being formed with a release notch, means to elevate the locking pins sufficiently to move the release notches adjacent the driving shafts to release the driving shafts for rotation responsive to the movement of the carriage members to positions adjacent the rack members, manually operated means to elevate said rack members to positions wherein the pinion gears meshingly engage the lower rack bars, means biasing the rack members to lowered positions wherein the pinion gears meshingly engage the upper rack members, the rack members being each formed with a pair of vertically spaced, horizontal longitudinally extending grooves, and a supporting projection on each carriage member located to slidably engage in one or the other of the grooves of the associated rack bar in accordance with the raised or lowered positions of the rack members.

References Cited in the file of this patent

UNITED STATES PATENTS

| | | |
|---|---|---|
| 2,516,808 | Seger | July 25, 1950 |
| 2,845,803 | Price | Aug. 5, 1958 |